(12) United States Patent
Ivanov

(10) Patent No.: US 8,345,015 B2
(45) Date of Patent: Jan. 1, 2013

(54) SENSOR APPARATUS AND METHOD FOR GENERATING SIGNALS INDICATIVE OF THE POSITION OR CHANGE IN POSITION OF LIMBS

(75) Inventor: Artem Ivanov, Gilching (DE)

(73) Assignee: Ident Technology AG, Wessling (DE)

( * ) Notice: Subject to any disclaimer, the term of this patent is extended or adjusted under 35 U.S.C. 154(b) by 529 days.

(21) Appl. No.: 12/597,619

(22) PCT Filed: Apr. 28, 2008

(86) PCT No.: PCT/EP2008/003433
§ 371 (c)(1),
(2), (4) Date: Oct. 26, 2009

(87) PCT Pub. No.: WO2008/131954
PCT Pub. Date: Nov. 6, 2008

(65) Prior Publication Data
US 2010/0063421 A1 Mar. 11, 2010

(30) Foreign Application Priority Data
Apr. 26, 2007 (DE) .......... 10 2007 020 873

(51) Int. Cl.
*G06F 3/041* (2006.01)
(52) U.S. Cl. ........ 345/173; 345/176; 178/18.01; 178/18.09
(58) Field of Classification Search .......... 345/173, 345/174; 178/18.01–18.09
See application file for complete search history.

(56) References Cited

U.S. PATENT DOCUMENTS

| | | | |
|---|---|---|---|
| 6,222,528 B1 * | 4/2001 | Gerpheide et al. | 345/173 |
| 6,400,359 B1 * | 6/2002 | Katabami | 345/173 |
| 6,452,514 B1 * | 9/2002 | Philipp | 341/33 |
| 7,868,873 B2 * | 1/2011 | Palay et al. | 345/173 |
| 8,031,180 B2 * | 10/2011 | Miyamoto et al. | 345/173 |
| 2005/0078093 A1 * | 4/2005 | Peterson et al. | 345/173 |
| 2007/0273670 A1 * | 11/2007 | Nordahl | 345/173 |
| 2008/0018608 A1 * | 1/2008 | Serban et al. | 345/173 |
| 2008/0088201 A1 * | 4/2008 | Konishi et al. | 310/313 D |

FOREIGN PATENT DOCUMENTS

DE 102005038678 A1 2/2007
WO 97/41458 A1 11/1997

OTHER PUBLICATIONS

International PCT Search Report, PCT/EP2008/003433, 4 pages, Nov. 25, 2008.
Second Chinese Office Action with English Translation, Chinese Patent Application No. 200880022205.2, 8 pages, Jun. 19, 2012.

* cited by examiner

*Primary Examiner* — Amare Mengistu
*Assistant Examiner* — Premal Patel
(74) *Attorney, Agent, or Firm* — King & Spalding L.L.P.

(57) ABSTRACT

A sensor apparatus for generating electrical signals which indicate the position or movement of limbs relative to a reference area has a transmitter electrode apparatus, a voltage generator for applying an alternating voltage to the transmitter electrode, a first receiver electrode apparatus, a second receiver electrode apparatus, and a third receiver electrode apparatus, wherein the first, second, and third receiver electrode apparatuses are each connected to high-impedance tapping systems. The first, second, and third receiver electrode apparatuses are preferably each connected to high-impedance inputs of an impedance transformer system, wherein information indicative of a location or movement is obtained on the basis of differences between the electrical events present at the outputs of the respective impedance transformer.

24 Claims, 13 Drawing Sheets

SENSOR APPARATUS AND METHOD FOR GENERATING SIGNALS INDICATIVE OF THE POSITION OR CHANGE IN POSITION OF LIMBS

CROSS REFERENCE TO RELATED APPLICATIONS

This application is the US national phase of PCT application PCT/EP2008/003433, filed 28 Apr. 2008, published 6 Nov. 2008 as WO2008/131954, and claiming the priority of German patent application 102007020873.3 itself filed 26 Apr. 2007, whose entire disclosures are herewith incorporated by reference.

FIELD OF THE INVENTION

The invention relates to a sensor apparatus and to a method for generating electronic signals which indicate a spatial position and/or the movement of limbs, particularly the hand of a user relative to the sensor apparatus. These electronic signals can then be used for carrying out input processes in data processing, communication and other electrical devices.

OBJECT OF THE INVENTION

The object of the invention is to create solutions by which signals indicative of the position and/or the movement of limbs can be generated in a particularly advantageous manner.

SOLUTION ACCORDING TO THE INVENTION

This object is achieved according to the invention by a sensor apparatus for generating electrical signals which indicate the position or movement of limbs relative to a reference area, the apparatus comprising a transmitter electrode apparatus, a voltage generator for applying an alternating voltage to the transmitter electrode, a first receiver electrode apparatus, a second receiver electrode apparatus, and a third receiver electrode apparatus, wherein the first, second, and third receiver electrode apparatuses are each connected to high-impedance tapping systems.

The first, second, and third receiver electrode apparatuses are preferably each connected to high-impedance inputs of an impedance transformer system, wherein information indicative of a location or movement is obtained on the basis of differences between the electrical events present at the outputs of the respective impedance transformer.

A composite signal can be formed from the levels tapped at the receiver electrodes, this signal representing the sum of voltages present at the receiver electrodes. This composite signal can be standardized using a specified amplification factor and made available to a comparator input of the respective impedance transformer system.

Preferably, a synchronous detector system is provided, which supplies signals indicative of the synchronicity of the output signal at the respective impedance transformer system, particularly of the voltage level and/or the phase compared to the exciting voltage. Information indicative of the location or movement can be obtained on the basis of differences between the electrical events present at the outputs of the respective synchronous detector.

According to a particularly preferred embodiment of the invention, the receiver electrodes are disposed symmetrically around the transmitter electrode apparatus. The transmitter electrode is preferably supplied by a generator (microcontroller) with alternating current so as to produce an electrical, preferably quasi-static electric field. The receiver electrodes are preferably disposed symmetrically around the transmitter electrode.

The voltage present at the receiver electrodes contains information about the distribution of the field of the transmitter electrode.

The receiver electrodes are connected to the high-impedance inputs of the impedance transformers so as not to interfere with the electrical field of the transmitter electrode.

A mean value is formed from the respective signals downstream of the impedance transformer. This mean value can be amplified. The amplified signals can be used to obtain the amplitude using a synchronous detector, wherein the amplitude can then be digitized by an ADC and forwarded to a microcontroller for evaluation.

Instead of the synchronous detector, it is also possible to use a diode rectifier or peak detector.

The sensor apparatus according to the invention can in particular be used to detect gestures, movements, or hand positions. Preferably at least the predominant part of the sensor electronics, to include the measuring electrodes, is designed in a compact chip-like manner. In this way, a particularly advantageous application of the sensor technology is enabled.

BRIEF DESCRIPTION OF THE FIGURES

Additional details and characteristics of the invention will be apparent from the description below in conjunction with the figures. Shown are.

DETAILED DESCRIPTION OF THE FIGURES

Figure 1:
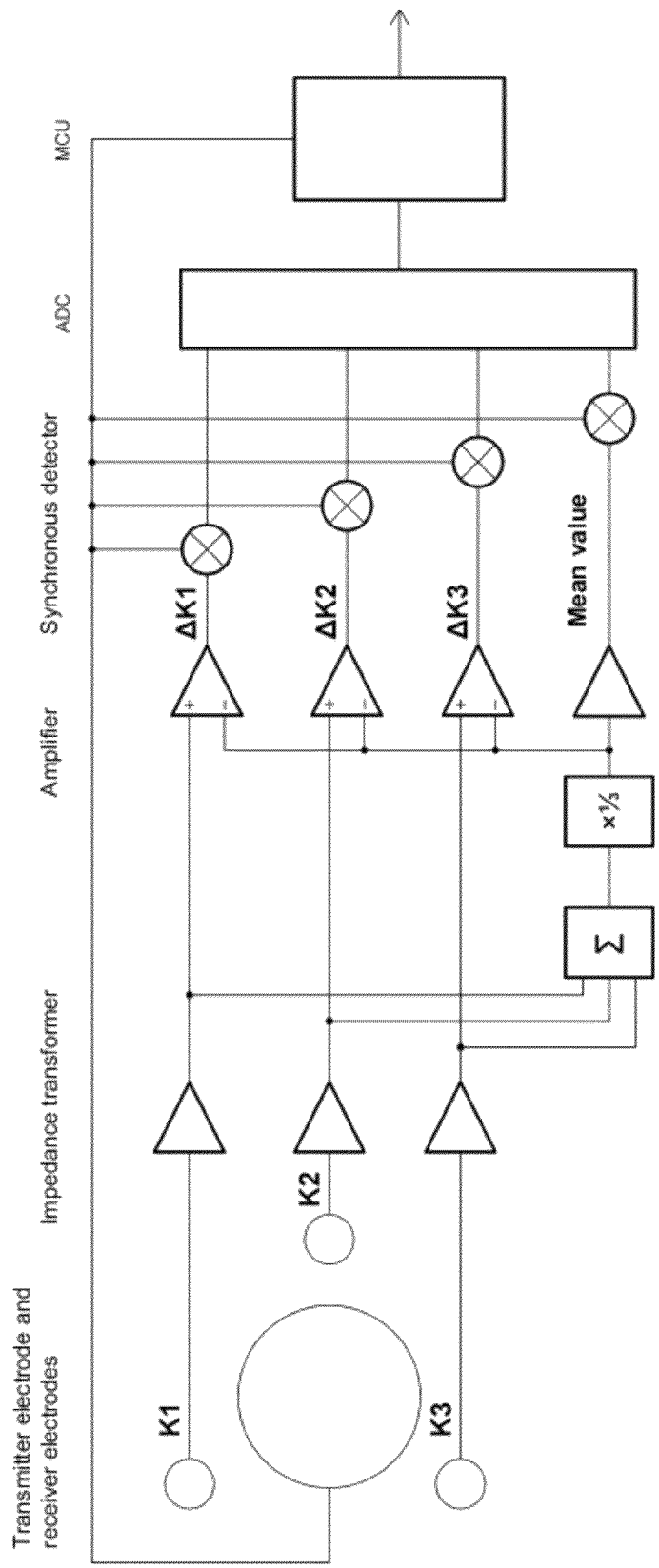
FIG. 1 a block diagram to illustrate the basic design of a sensor apparatus according to the invention.

FIG. 1 shows a preferred circuit design of a sensor apparatus according to the invention in the form of a block diagram.

The sensor apparatus according to the invention preferably comprises three measuring electrodes K1, K2, K3. This produces a more homogeneous field as compared to two-electrode concepts.

In order to linearize the responses as a function of the distance, preferably a logarithmization step is carried out (for example by diodes). The analog signals are preferable captured synchronously, for example using a fast ADC of the MSP430 microcontrollers (F2012). Advantageously, a direct connection to an Ident USB module can be integrated into the module according to the invention for connecting to a computer.

In the circuit according to FIG. 1, the transmitter electrode G is supplied with alternating voltage by a generator (microcontroller) and forms a surrounding electrical field. The receiver electrodes K1, K2, K3 are disposed symmetrically around the transmitter electrode G, and the voltage present at these electrodes contains information about the distribution of the field of the transmitter electrode G. The voltages (ac) at the receiver electrodes K1, K2, and K3 are present at the channels 1, 2, and 3 of the impedance transformers I1, I2, I3. So as not to interfere with the electrical field, the receiver electrodes K1, K2, K3 are connected to the high-impedance inputs of the impedance transformers I1, I2, I3.

A mean value is formed from the signals downstream of the impedance transformer. Furthermore, for each channel the difference between the signal thereof and the mean value is amplified: $\Delta K1$, $\Delta K2$, and $\Delta K3$. The mean value is also amplified.

The amplified signals are used to obtain the amplitude using a synchronous detector, wherein the amplitude is then digitized by an ADC and forwarded to a microcontroller for evaluation. Instead of the synchronous detector, for example, a diode rectifier, a peak detector or the like can be used, or as an alternative thereto the alternating voltage can be directly digitized by the ADC.

The microcontroller provides evaluated, or partially evaluated, results for further processing, in particular for the extraction of X, Y and optionally Z information.

Figure 2:
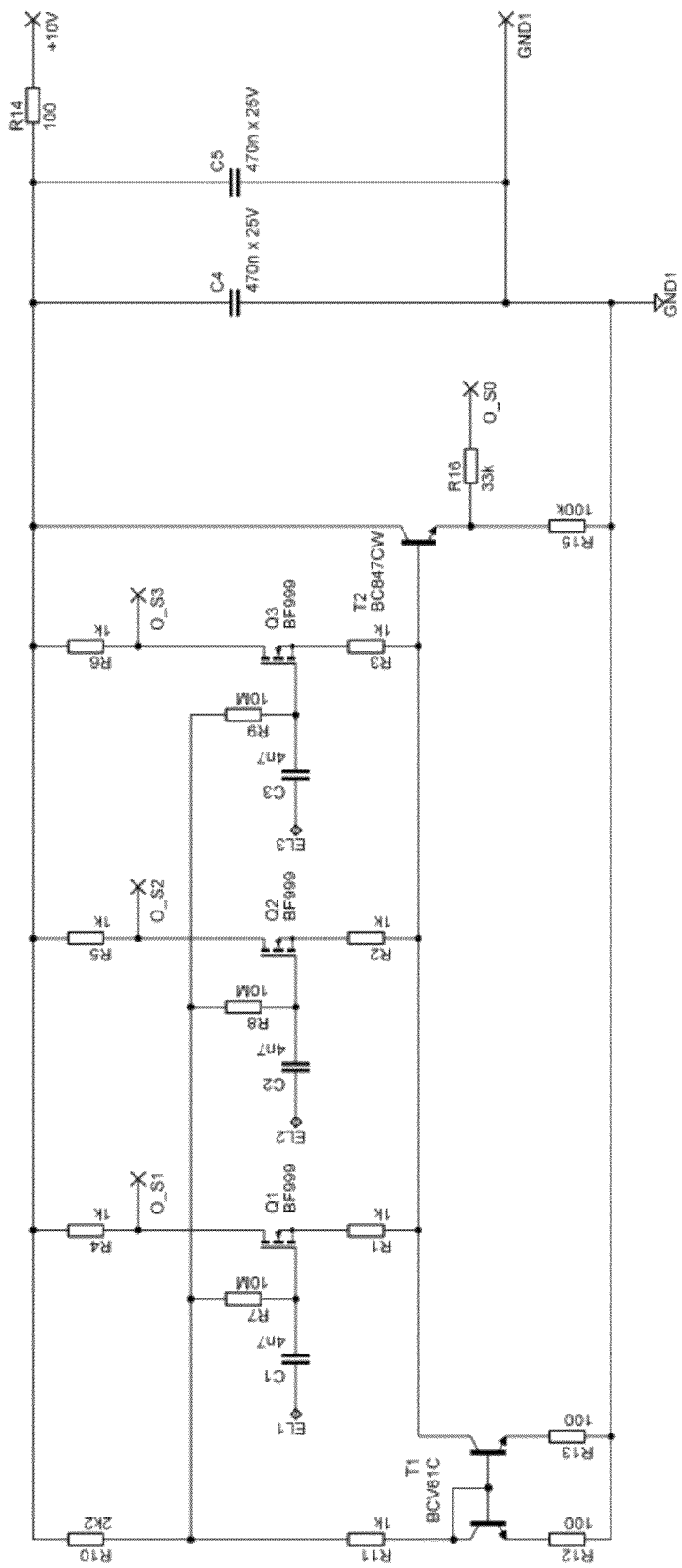
FIG. 2 a circuit diagram to illustrate the design of the input circuit.

FIG. 2 illustrates a preferred configuration of an input circuit according to the invention. The input circuit shown in FIG. 2 forms three channels. Each channel has a receiver electrode (denoted with EL1 to EL3) and comprises a MOSFET. The circuit is designed as a differential amplifier, however comprising more than two (in this case three) channels. All three transistors Q1, Q2, and Q3 are connected to a power source (implemented as T1). The signals are tapped at drains of the transistors: each channel has a dedicated output O_S1 to O_S3. In addition, there is an output (O_S0). It indicates the sum of the three input signals and comes from the emitter follower T2.

The MOSFETs comprise resistors at the sources thereof in order to compensate for the different characteristic lines of the transistors.

Figure 3:
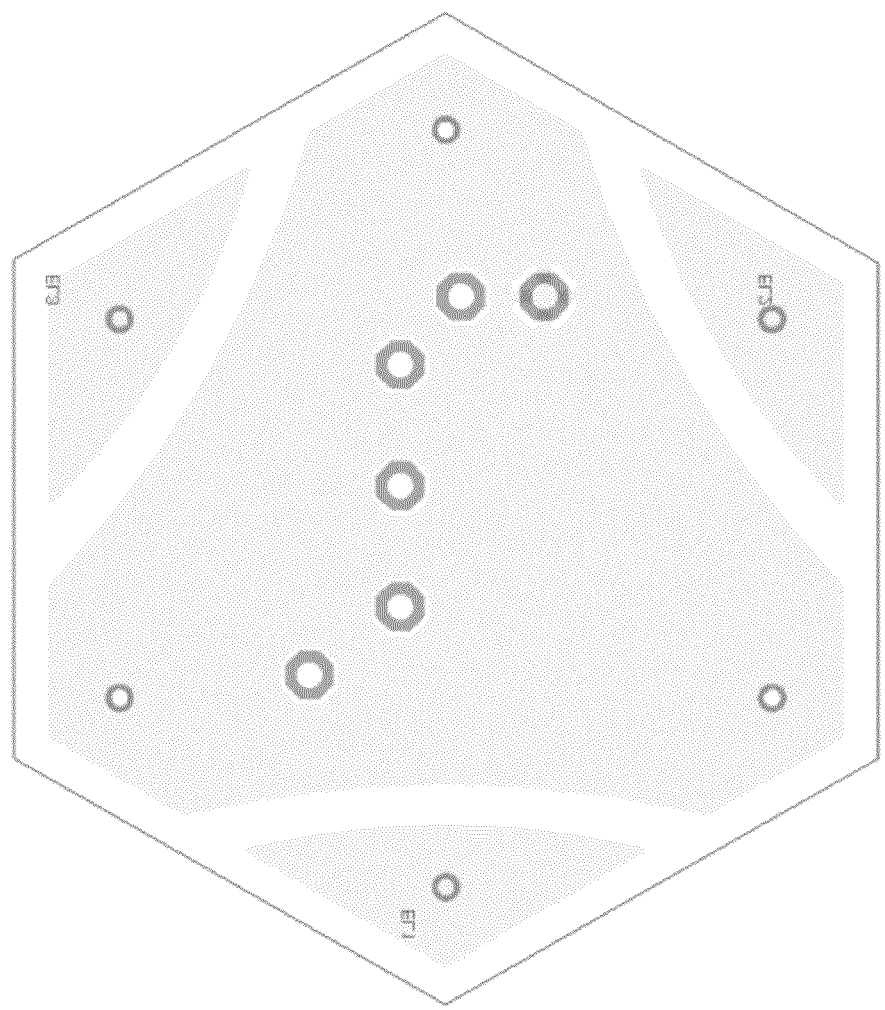
FIG. 3 a schematic representation to illustrate an exemplary design of the transmitter and receiver electrode apparatuses.

FIG. 3 illustrates the geometric arrangement of the electrodes K1, K2, K3. This FIG. shows that the large area (GND1), which shields the entire circuit including all the components from the outer electrical field, is located at the center. The electrodes are disposed symmetrically to each other at an angle of 120° and thereby form a triangle.

The GND1 signal is not constant relative to ground: it oscillates, for example, at a carrier frequency of about 100 kHz.

The amplitude at GND1 is about 5 volts peak to peak. This oscillation is produced in the second part of the circuit.

Humans interfere with the field produced by the GND1 signal, specifically such that the human hand or the human leg constitutes a short circuit to ground. The field decreases quickly in the direction in which the hand is located. This is reflected in electrical signals at the electrodes K1, K2, K3 and at the outputs of the circuit.

As a result of the idea to configure the circuit as a differential amplifier, every electrode for symmetry reasons has the same potential and the same alternating field amplitude in a non-interference state, in which the field of the GND1 signal is not influenced. This alternating field amplitude is about 1 to 2 volts and changes little relative to this level if a hand is moved into the vicinity the circuit. As the differential input circuit significantly weakens this in-phase input signal, only the differences between the electrode signals are provided at the outputs. These differences are small signals that can be further amplified.

Figure 4:
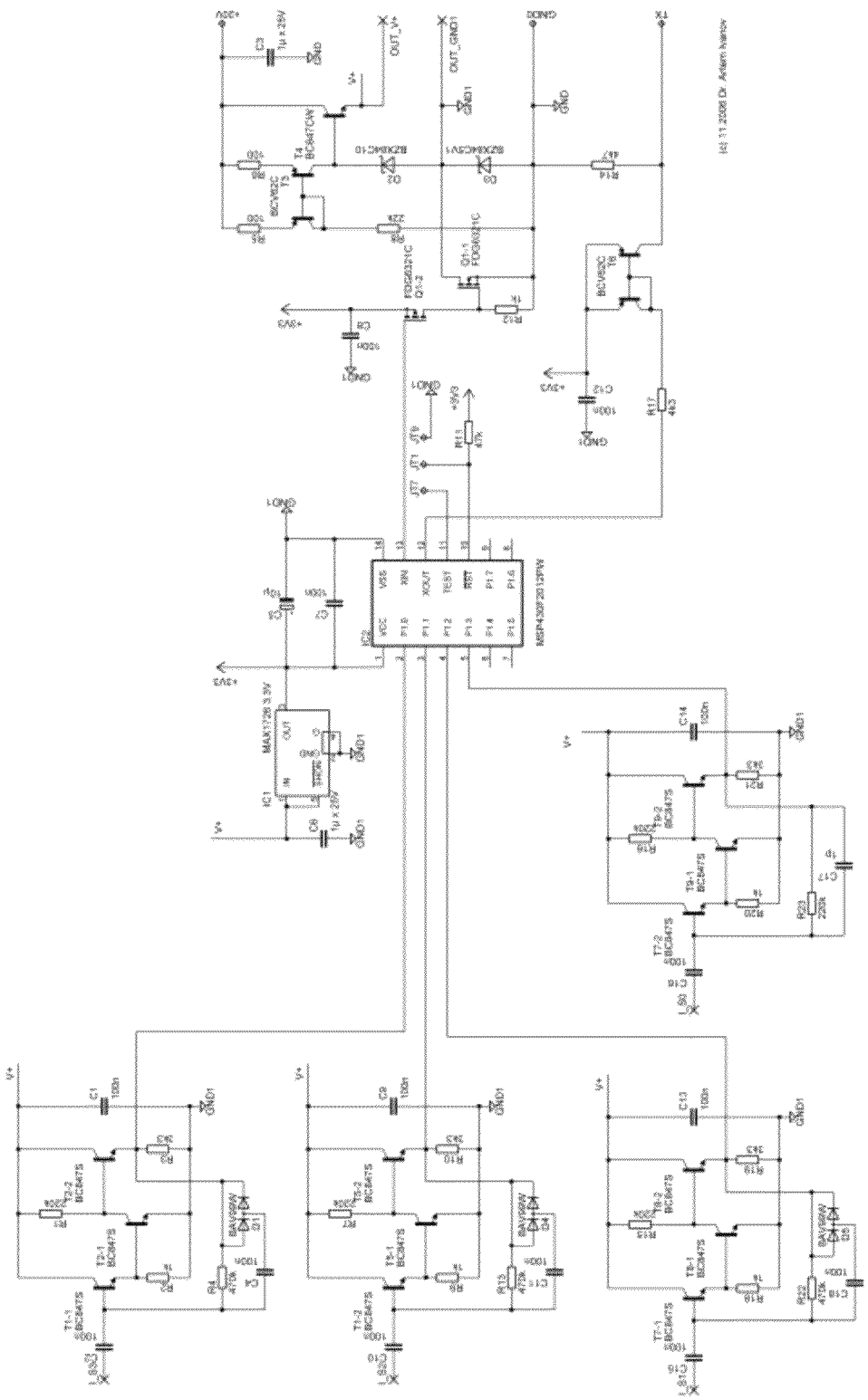
FIG. 4 a circuit diagram to illustrate an output circuit according to the invention.

FIG. 4 shows a circuit according to the invention, by which logarithmic compression can be implemented. In this circuit, the output signals of the electrodes are further amplified, digitized in the controller using an analog-to-digital converter, and transmitted by the controller to the computer by way of the ART interface. At the same time, the controller carries out the generation of the carrier frequency and the synchronous detection of the individual signals.

The output signals of the input circuit (O_S0 to O_S3) arrive at the input connections I_S0 to I_S3. The amplification of the channel S0 (composite signal) is carried out in a linear fashion using a coefficient of about 7 (T7-2, T9-1, T9-2). The electrode signals S1 to S3 are amplified with a logarithmic characteristic line. Differences in the circuitry-related configuration of the amplifiers exist only with respect to feedback—resistive or using diodes—and the basic amplifiers are preferably configured the same.

The basic amplifier comprises 3 transistors and the amplification thereof is about 40 dB. Due to this relatively high amplification, it was achieved that the properties of all channels and the hexagon circuits remain largely the same relative to each other, despite transistor scattering.

The operating principle of the amplifier is explained by way of example, referencing channel S3. The transistors T1-1 and T2-2 are connected as emitter followers and are used to adjust the input or output resistance. The transistor T2-1 acts as an amplifier, wherein the amplification is in fact determined by the voltage drop at the emitter resistor, which is to say that the amplification is in fact dependent on the supply voltage. For the applied supply voltage of about 9.5 V, the amplification is about 40 dB.

Through the use of logarithmization for channels S1 to S3, it becomes possible to compensate for the highly non-linear dependence of the signals on the distance. This means that the small signals coming from a remote object are amplified more strongly than the large signals occurring in the vicinity of the circuit. In this way, a flatter transmission line is achieved for the entire circuit. Better results are obtained for the composite signal S0 with the linear amplification.

The circuit part around the transistors Q1, T3, and T4 is used to produce the GND1 signal. The output voltage V+ (output OUT_V+) is constant relative to GND1 and is about 9.5 volts, wherein the two voltages together oscillate back and forth relative to ground—in our case GND—with about 5 volts peak to peak, as a function of the output of the controller. These oscillations take place with the carrier frequency of about 100 kHz. This frequency is synchronous with the scanning frequency for every channel, so that the synchronicity and synchronous detection of the channel inputs is ensured.

The connection to the computer is established by way of a tx line, which can be connected, for example, to the Ident USB module developed by the applicant. Since the controller also operates relative to GND1, the output signal thereof must be qualified relative to ground. This is done by using a current mirror, which is set up around the transistor T6.

The microcontroller used is the MSP430F2012. It has a frequency of 16 megahertz and is able to digitize over 200 kilosamples per second, which makes it very suitable for our synchronous modulation.

Layout

The input circuit according to the invention and the output circuit are preferably each configured as dedicated (hexagonal) printed circuit boards. Geometrically, the contacts for GND1, V+, S0 to S3 are preferably configured such that the circuit boards can be disposed on top of each other and are combined with straight wire sections.

The layout of the two printed circuit boards has proven to be significant. Preferably, the coordination is done such that, for one, the measuring electrodes have identical conditions with respect to the electrical field and, secondly, the entire amplification of all channels is the same, without substantial interference by parasitic capacitances.

The above requirements can advantageously be met in that:
1. the electrodes are disposed with 120° symmetry.
2. the circuit boards have the same symmetry as the electrodes so as not to interfere with the field provided thereon. In other words: triangular, hexagonal and the like, all the way to round. the signals (GND0, +20V) constant relative to GND0 are shielded by the measuring electrodes to the extent possible because these are identical to the signal of the user.

Data Evaluation/Software

In particular two functionally prominent approaches were tested for evaluating the measured variables. As a first approach, the field approximation using an inclined plane and calculation of the coordinates using a stored reference table is described. The subsequent description of the approach of the field approximation using an inclined plane is provided in conjunction with FIGS. 5, 6, and 7.

Field Approximation Using an Inclined Plane

This type of evaluation is based on relatively rough ideas about the manner in which the electrical field around the hexagon is influenced by humans. This method requires relatively low computing capacity and is particularly suited for simpler applications, such as determining the arrival direction or rough key functions. The largest imprecision of this method occurs in the direct vicinity of the hexagon.

For the model, three axes are introduced: X and Y in the plane of the electrodes, and the signal axis S (refer to FIG. 5 and FIG. 6).

Figure 5:
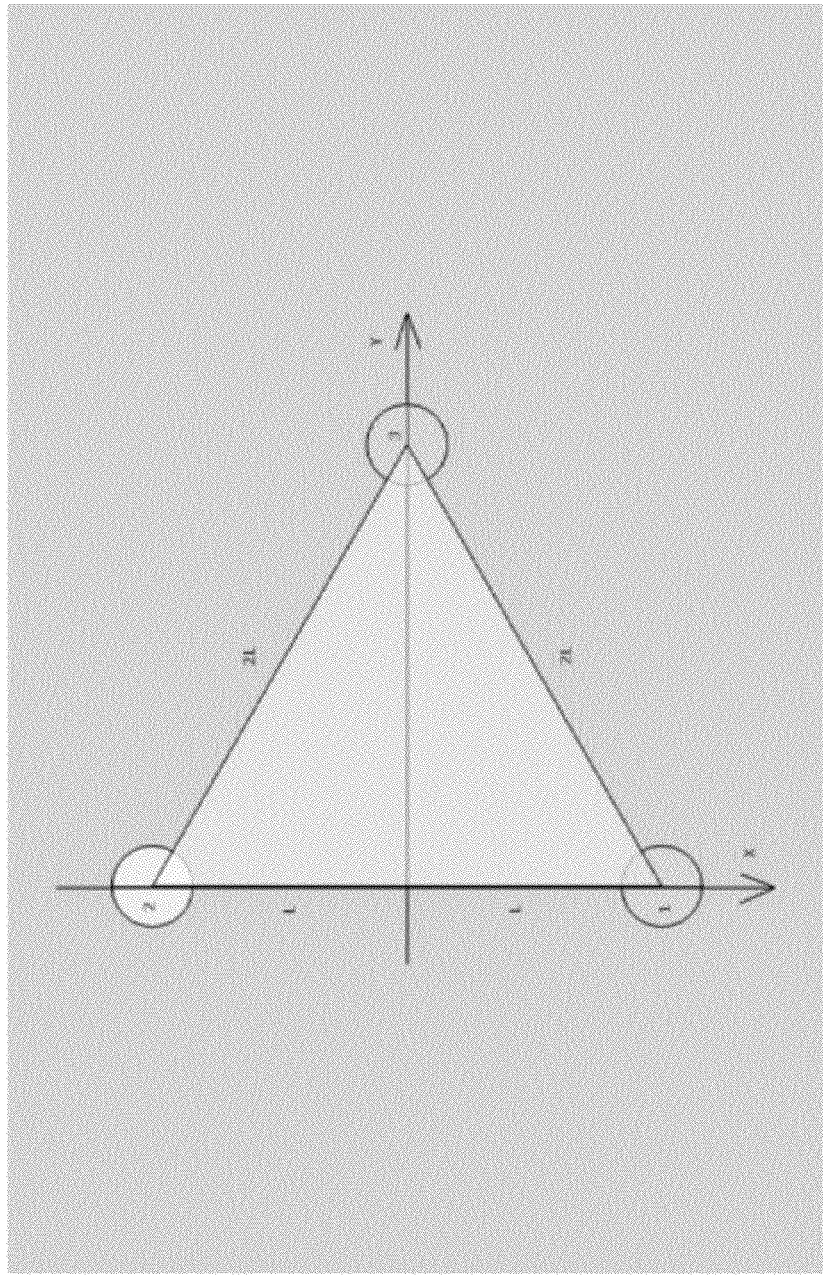
FIG. 5 a coordinate system to explain the evaluation principle according to the invention with a view of the XY plane.
Figure 6:
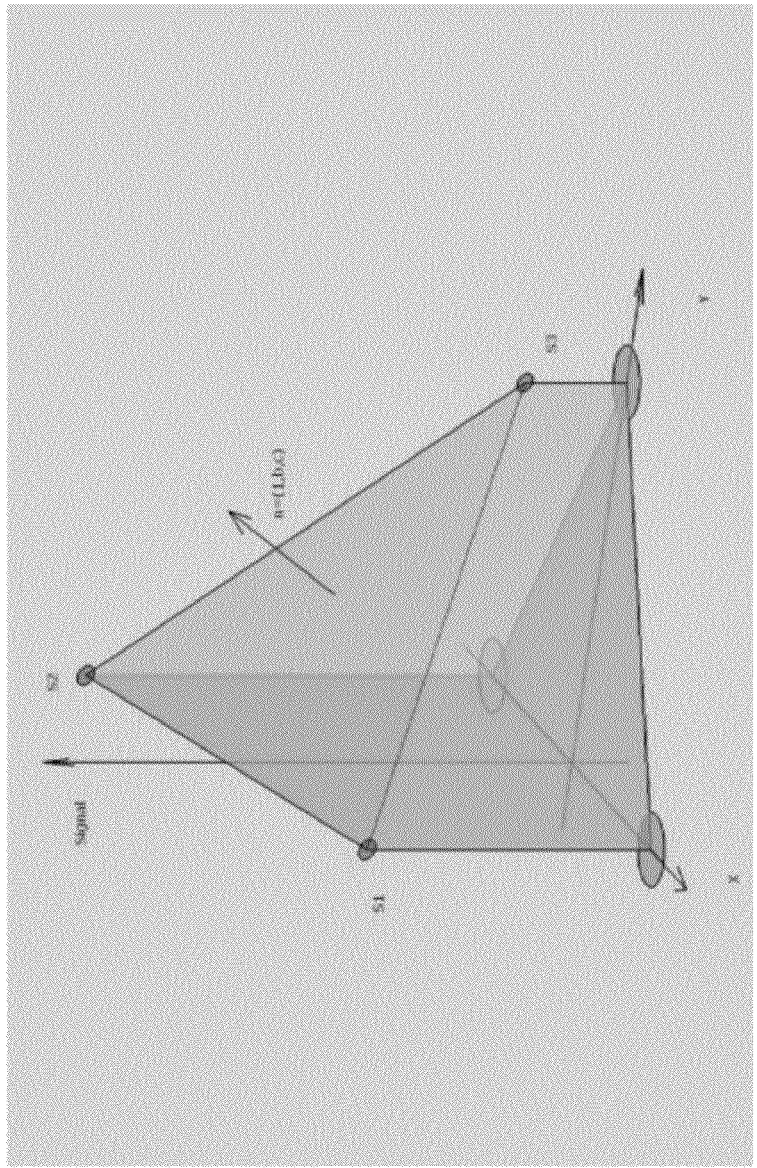
FIG. 6 a spatial view of the coordinate system to further explain the evaluation principle according to the invention.

The electrodes in FIG. 5 are denoted with 1, 2, 3. The side of the triangle at which the electrodes are located is 2L. The output signals of the hexagon for the electrodes 1 to 3 are denoted with $S_1$ to $S_3$ and shown on the signal axis (FIG. 6).

These 3 points in the (x,y,z) space define a plane, which has the strongest "inclination" with respect to the electrode having the smallest signal. The direction of incline of the plane agrees with the direction of the interfering factor of the electrical field (such as the human hand); the incline of the plane increases as the interfering factor comes closer to the electrodes.

The quantitative information with respect to the direction and distance to the interfering factor can be obtained with surprising reliability using analytical geometry. To this end, the equation for the plane is written as $$x+by+cS+d=0$$

the normal vector being $\bar{n}=(1,b,c)$ (FIG. 5). After inserting the values for the electrodes in the equation and solving the linear system, the parameters for the normal vector are obtained:

$$c = -\frac{2L}{S_1 - S_2},$$
$$b = -\frac{S_1 + S_2 - 2S_3}{\sqrt{3}(S_1 - S_2)}.$$

Figure 7:
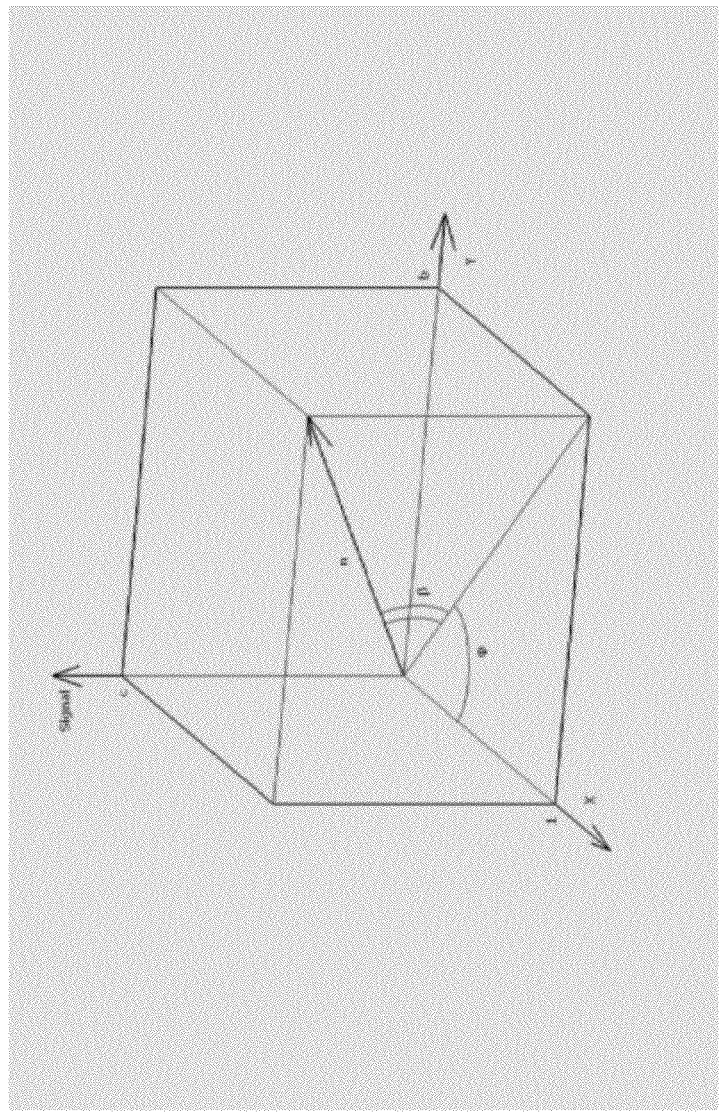
FIG. 7 a perspective representation to illustrate a normal vector calculated according to the invention.

From these parameters, the required values for the direction φ and distance R (expressed by the incline β) are obtained (FIG. 7).

$$\varphi = \mathrm{arc}tg(b),$$
$$R = R_0 \frac{2\beta}{\pi},$$
$$\beta = \mathrm{arc}tg\left(\frac{c}{\sqrt{1+b^2}}\right).$$

The coordinates of the interfering factor are then known as R and φ.

These coordinates for the positions of the hand are clearly not very close to the hexagon (with the exception of the ambiguity of different fingers with respect to fist/hand positions). The calculated direction of movement of the hand does not always agree with the actual direction of movement.

Calculation of the Coordinates Using a Stored Reference Table (Second Approach)

Figure 8:
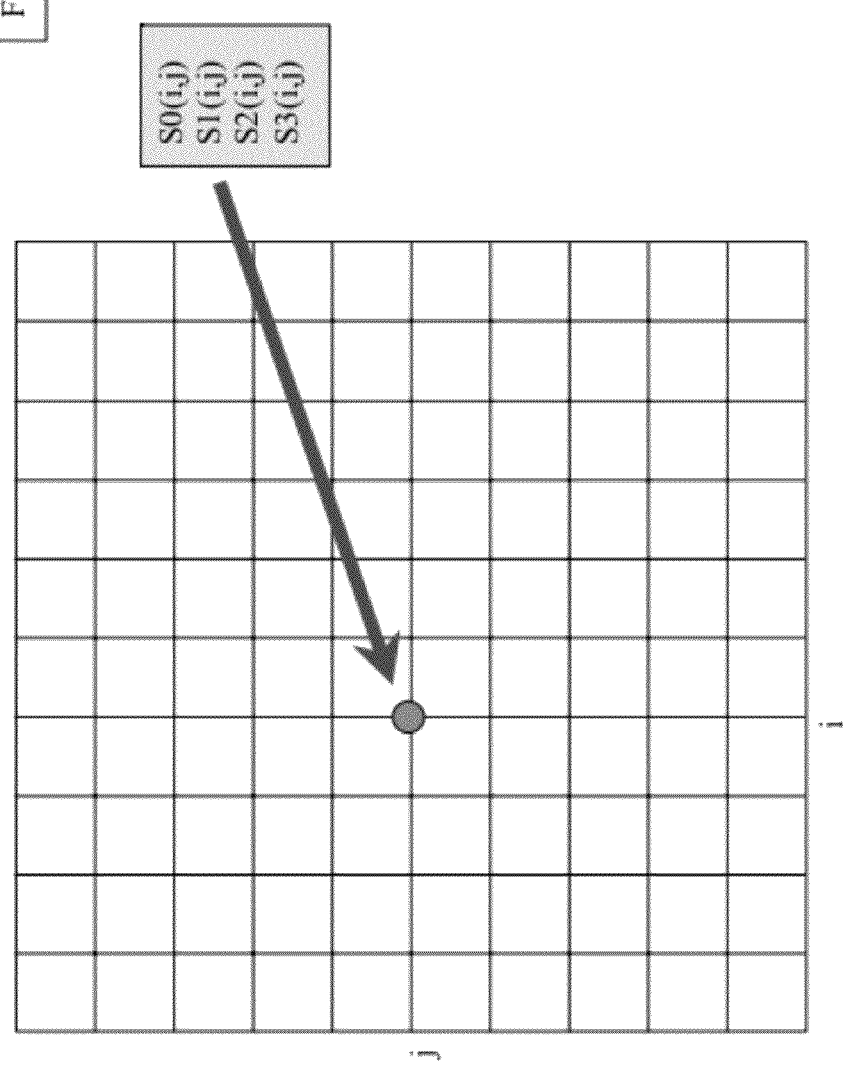
FIG. 8 a grid system comprising a curser point positioned therein on the basis of a gesture based on the concept according to the invention.
Figure 9:
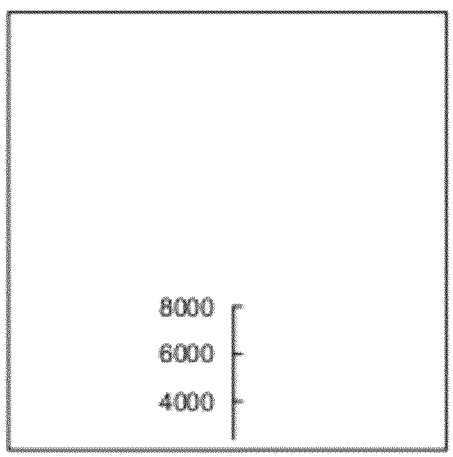
FIG. 9 a first diagram to illustrate the spatial association of measured values.
Figure 10:
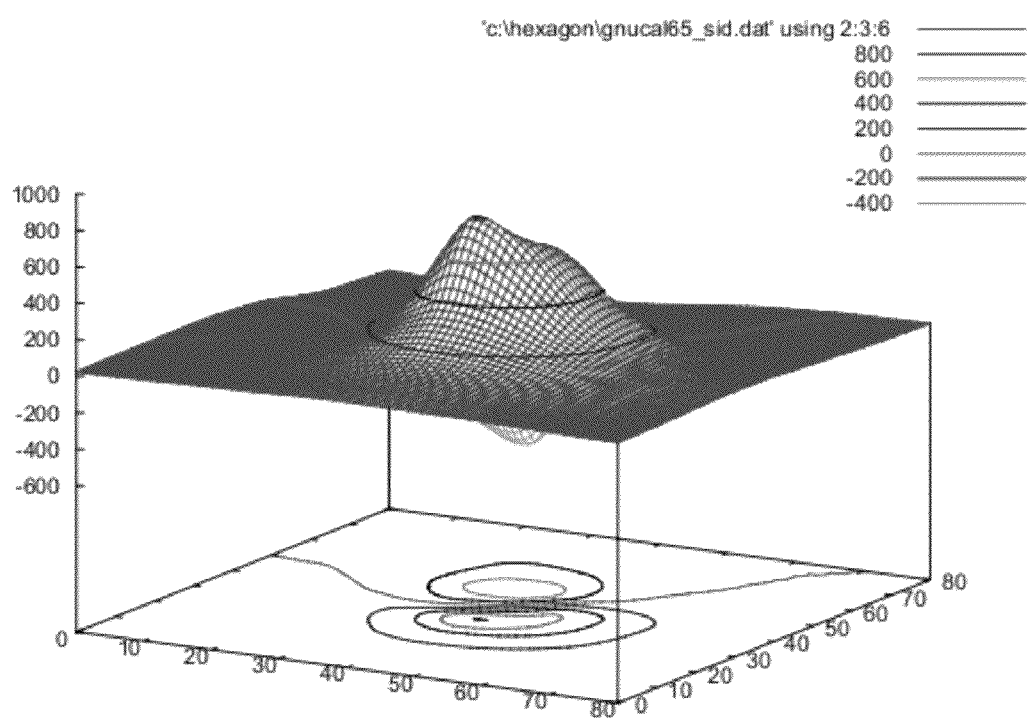
FIG. 10 a second diagram to illustrate the spatial association of measured values.
Figure 11:
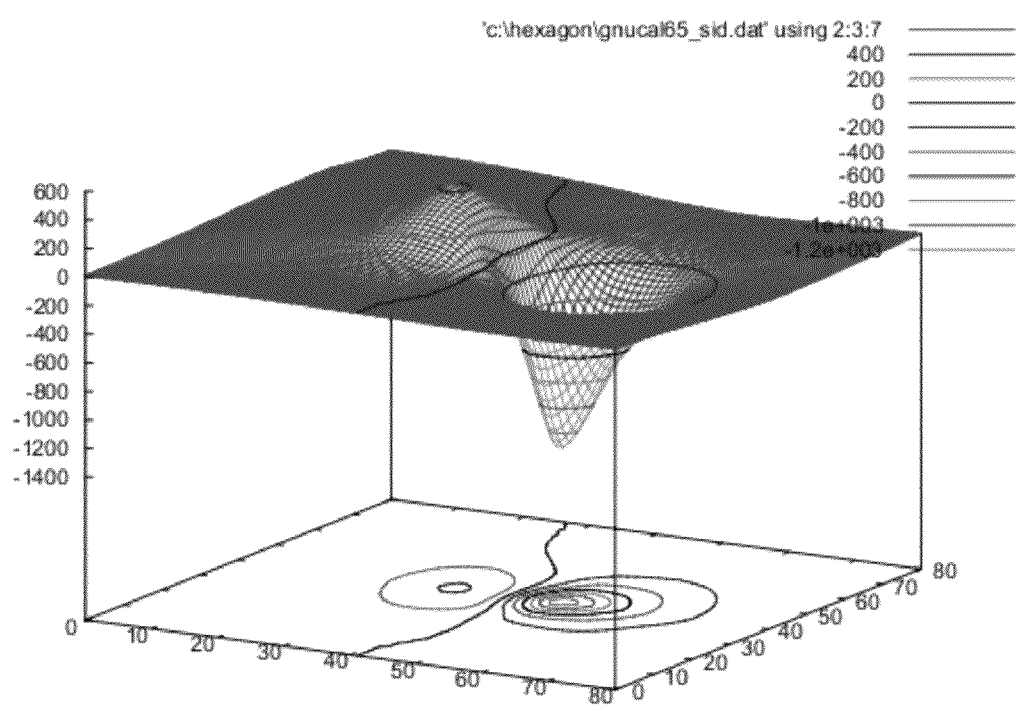
FIG. 11 a third diagram to illustrate the spatial association of measured values.

This evaluation method will be explained in conjunction with FIG. 8. This concept in particular also opens up the possibilities of hardware and software for testing. The method is based on the existence of a table of the values of all channels over a "table surface". These values are obtained by measuring (taught). The measurement is carried out in a plurality of equidistant points disposed in a square. A grid measuring 20 cm×20 cm and 2 cm increments has proven to be suitable (FIG. 8). The measured values are captured at all intersecting points of the grid—in total 121 points, marked with indexes i and j—and stored in a table (stored as a file for later use).

In this example, the stored data, for example, has a spatial resolution of 2 cm. This relatively coarse resolution can be refined using interpolation. It has been shown that by interpolation it was possible to increase the resolution approximately by a factor of 8.

The interpolation is preferably carried out incrementally, each time by a factor of 2. In order to obtain the smooth curves, the data is interpolated based on the original values and the derivations of the left and right sides. Good results are obtained if the relative weighting of original values to derivations is 8 to 1.

The measured data can be represented for each channel as surfaces in the (x, y, z) space (FIG. 9 to FIG. 12). The interpolation causes these surfaces to be "smooth" and have meaningful values even between the measured data. The measurement data was recorded using a hexagon, which was disposed beneath a table top measuring 25 mm thick. The detected hand movement was recorded with the index finger extended.

The principle of coordinate determination is that every hand position captured by the hexagon has a unique set of values of the channels. The task then is "only" to find a suitable cell in the stored table, for which the measured and stored values agree.

In order to come closer to solving the problem, it is possible to use a view of "equipotentials": for each newly measured value, a complete (x, y) line exists where the corresponding (x, y, z) surface assumes the value—which is to say an equipotential. Such equipotentials are also represented in FIG. 9 to FIG. 12. The correct cell (coordinate) is that at which all 4 equipotentials intersect.

With real-life measurements, optionally the following difficulties emerge:

the hand position does not always correspond to that which was used during teaching, the teacher and the user do not necessarily have identical hands, noise and drift of the electronics do not allow it to obtain precisely the values obtained "as during teaching" everywhere, and so forth.

All these contribute to the fact that the equipotentials no longer intersect at the same point. In addition, with small distances to the hexagon, for example if it is installed behind a thin plastic panel (d<10 mm), the (x, y, z) surfaces become much more complicated, and the equipotentials break up into several closed lines, which result in a large number of intersecting possibilities.

Since one cannot assume a single intersecting point of the equipotentials, in the software the distance between the equipotentials is computed. If it is less for all 4 equipotentials than a defined threshold value, the coordinate is calculated.

The shape of the (x, y, z) surface of a channel is S=f(x, y). In order to calculate the distance of the equipotential of channel k having the value $f_1$ to a cell where the equipotential of the channel n passes (this is where the channel k has the value $f_2$), the formula $$\Delta \vec{r} \approx \frac{f_1 - f_2}{\vec{\nabla} f}$$

is used. A simple estimation of the value of the gradient $\vec{\nabla} f$ can be made at the functional values in the corners of the affected cell:

$$\vec{\nabla} f \approx \frac{f_{max} - f_{min}}{a}.$$

Here, $f_{max}$ and $f_{min}$ are the maximum or minimum value of f in the cell, $\alpha$ is the cell side. In this way, the distance can be computed as follows:

$$|\Delta \vec{r}| \approx \frac{|f_1 - f_2|}{f_{max} - f_{min}} \cdot a.$$

In each cell where for all 4 channels $|\Delta \vec{r}|$ is smaller than a threshold value (here $4a$), a weighting factor is formed:

$$w_{i,j} = \frac{1}{\sum_{k=0}^{3} |\Delta \vec{r}|^2},$$

where the summation is across all channels.

The coordinates of the finger are defined as the weighted sum across all selected cells:

$$x = \frac{\sum w_{i,j} \cdot i}{\sum w_{i,j}},$$

$$y = \frac{\sum w_{i,j} \cdot j}{\sum w_{i,j}}.$$

In this, the expression $\Sigma w_{i,j}$ can be considered a measure of the accuracy of the calculation.

Figure 12:
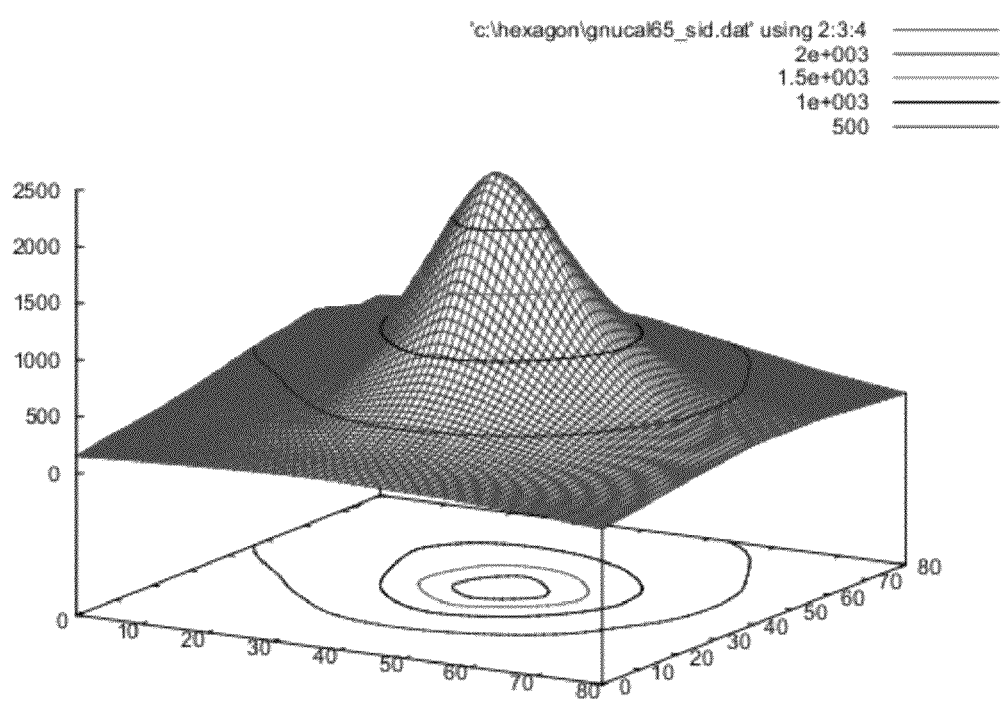
FIG. 12 a fourth diagram to illustrate the spatial association of measured values.
Figure 13:
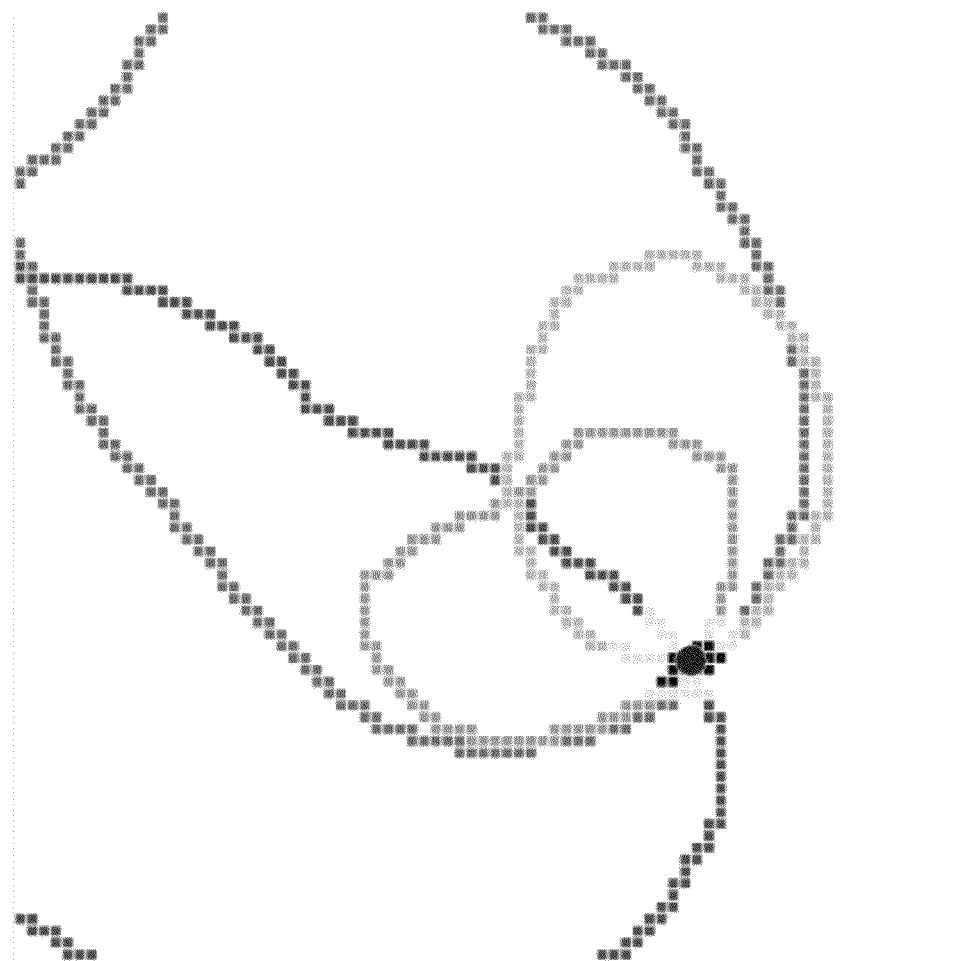
FIG. 13 a diagram to illustrate the courses of equipotential lines.

The above procedure is illustrated in FIG. 12. In the figure, a snapshot is shown with four lines of the equipotentials (S0: magenta, S1: red, S2: green, S3: cyan). Yellow indicates cells on the equipotentials having distances of less than $4a$ to the 3 other channels. Black indicates cells having distances to the 3 other channels of less than $2a$. The blue circle is located in the calculated coordinate (x, y).

The applicability of this evaluation method was also analyzed for determining the Z-position of the finger.

In order to determine the Z-position, teaching must be carried for at least one additional plane over the table. This can be done using a pad having a suitable thickness. In the experiment, a thickness of about 2 cm over the table was used. After teaching, linear interpolation of the values between the 2 measured layers was carried out. This produced the data for several Z-layers.

The coordinates of the finger are always calculated for all layers in the software. The expression $\Sigma w_{i,j}$ formed for each layer was used as a criterion for selecting the shown "active" layer, and consequently the Z-determination. It constitutes a measure of the accuracy of the calculation in every layer. The layer having the largest expression (which is to say where the equipotentials come closest) was assumed to be "active". The Z-coordinate of the finger was then the height of this layer.

The results show that the Z-coordinate can indeed be defined in the vicinity of the hexagon. The disadvantages of this method were that Z was not always correct and the relative high discontinuity in the (x, y) coordinate during changes of the active layer. In summary, it can be stated that this method enables particularly reliable detection of the spatial movement of the hand of a user within a movement area typical of hand gestures. This holds true particularly for applications where the user based on the illustrated coordinates (for example on the monitor) can accordingly reproduce the position of the hand (for example mouse function).

It is also possible to combine the approaches described above. Furthermore, it is possible to replace data which is outside the permissible value range with old, valid data in order to compensate for transmission and measured value errors.

$$y(t) = x(t-1)$$

$$\forall \begin{cases} x < x_{min} \\ x > x_{max} \end{cases}$$

Furthermore, it is possible to employ a (floating) median filter. From a set of consecutive measured values in an arbitrary time window, the one in the middle (median value) is selected. In this way, values varying significantly from the mean value are filtered out.

$$y(t) = \text{median}(x(t-a), x(t-a+1), \ldots, x(t-1), x(t))$$

It is also possible to compute a (floating) mean value. For example, a mean value can be formed from a set of consecutive measured values in an arbitrarily defined time window (arithmetic mean).

$$y(t) = \text{Mittelwert}(x(t-a), x(t-a+1), \ldots, x(t-1), x(t))$$

Furthermore, preferably a calibration is carried out.

During calibration, the measured values filtered according to 2 are further processed. The goal of the calibration is to separate signal changes caused by a movement of a body (hand) in the detection field from signal changes prompted by changes in the ambient conditions (time since activation, temperature, and the like). The points can in turn be used individually or in combination.

The present invention is particularly suited for implementing an input apparatus for compact mobile communication devices, as those described in the German patent application DE 10 2007 016 408.6 by the applicant. The content of this earlier application is hereby included in the present application in its entirety by reference.

The invention claimed is:

1. A sensor apparatus for determining a spatial position or movement of limbs, the apparatus comprising:
    a transmitter electrode,
    a voltage generator for applying an alternating voltage to the transmitter electrode,
    a first receiver electrode,
    a second receiver electrode, and
    a third receiver electrode, and
    first, second, and third impedance transformers each having a high impedance input each receiving a voltage from the first, second, and third receiver electrode, respectively,
    a mean value circuit coupled with the outputs of the first, second, and third impedance transformers;
    a first differential amplifiers for generating a differential value between the output of the first impedance transformer and the output of the mean value circuit;
    a second differential amplifiers for generating a differential value between the output of the second impedance transformer and the output of the mean value circuit;
    a third differential amplifiers for generating a differential value between the output of the third impedance transformer and the output of the mean value circuit.

2. The sensor apparatus according to claim 1 wherein information indicative of a location or movement is obtained on the basis of differences between electrical signals present at the outputs of the respective impedance transformer.

3. The sensor apparatus according to claim 2 wherein a divider divides the composite signal to generate the mean value.

4. The sensor apparatus according to claim 2 comprising synchronous detectors, which generate signals indicative of the synchronicity of the output signal at the respective impedance transformers with the alternating voltage.

5. The sensor apparatus according to claim 4 wherein the information indicative of a location or movement is obtained on the basis of differences between the electrical signals present at the outputs of the respective synchronous detector.

6. The sensor apparatus according to claim 4 wherein each synchronous detector provides signals indicative of the synchronicity of a voltage level compared to the alternating voltage.

7. The sensor apparatus according to claim 4 wherein the synchronous detector provides signals indicative of the synchronicity of a phase compared to the alternating voltage.

8. The sensor apparatus according to claim 4 further comprising an ADC receiving output signals of the synchronous detector, wherein the ADC is coupled a microcontroller unit for evaluation.

9. The sensor apparatus according to claim 1 further comprising an amplifier for amplifying the output of the mean value circuit.

10. The sensor apparatus according to claim 1 wherein the receiver electrodes are disposed symmetrically around the transmitter electrode.

11. The sensor apparatus according to claim 1 wherein the transmitter electrode is supplied by a generator with an alternating current and produces a surrounding electrical field.

12. The sensor apparatus according to claim 1 wherein the receiver electrodes are disposed symmetrically around the transmitter electrode.

13. The sensor apparatus according to claim 1 wherein the voltages present at the receiver electrodes contains information about the distribution of the field of the transmitter electrode.

14. The sensor apparatus according to claim 1 wherein the voltages present at the receiver electrodes are present at the receiver electrodes of channels 1, 2, and 3.

15. The sensor apparatus according to claim 1 wherein each differential amplifier is coupled with a diode rectifier.

16. The sensor apparatus according to claim 1 wherein each differential amplifier is coupled with a peak detector.

17. The sensor apparatus according to claim 1 further comprising an ADC directly coupled with the outputs of the first, second, third differential amplifier.

18. A method for generating electrical signals that indicate the position or movement of limbs, the method comprising the steps of
    applying an alternating electrical field to a transmitter electrode, and receiving voltages by at least three receiver electrodes disposed in the vicinity of the transmitter electrode,
    feeding the received voltages to high impedance inputs of impedance transformers;
    forming a mean value of output signals from the impedance transformers;
    forming first, second and third differential signals between the mean value and the output values of the respective impedance transformers.

19. The method according to claim 18, further comprising amplifying the mean value.

20. The method according to claim 19, further comprising feeding the amplified mean value to an ADC.

21. The method according to claim 19, further comprising feeding the differential signals and the amplified mean value to an ADC and determining the position or a movement of a limb from said differential signals and said amplified mean value.

22. The method according to claim 18, further comprising determining synchronicity of the differential signals with the alternating electrical field.

23. The method according to claim 22, further comprising feeding the synchronous detection signals to an ADC.

24. The method according to claim 18, further comprising feeding the differential signals to an ADC.

* * * * *